(No Model.) 3 Sheets—Sheet 1.
G. S. FOUTS.
ELEVATOR DRIVE WHEEL.
No. 576,960. Patented Feb. 9, 1897.
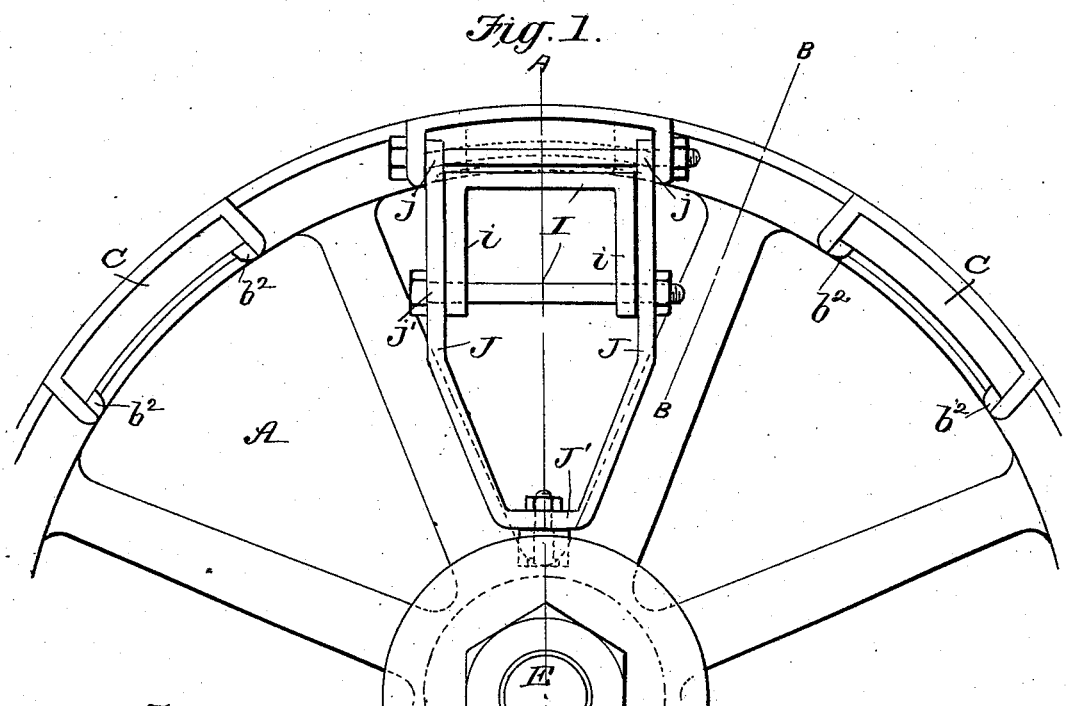
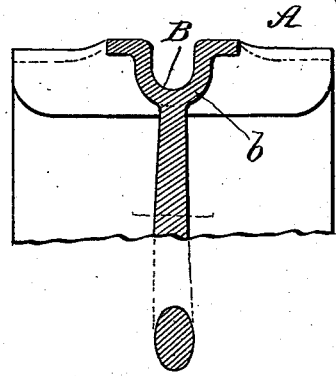
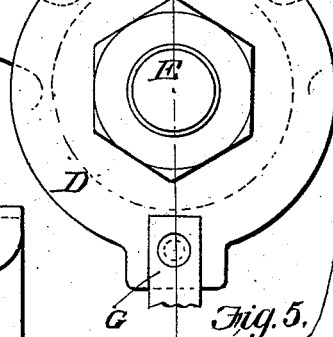
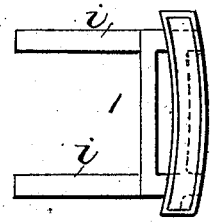
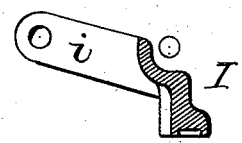
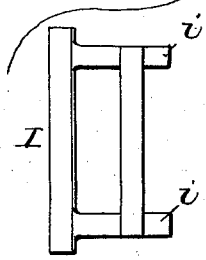
WITNESSES:
Jos. A. Ryan
P. B. Turpen
INVENTOR
George S. Fouts.
BY Munn & Co.
ATTORNEYS.

(No Model.) 3 Sheets—Sheet 2.

G. S. FOUTS.
ELEVATOR DRIVE WHEEL.

No. 576,960. Patented Feb. 9, 1897.

WITNESSES:
Jos. A. Ryan
P. B. Turpin

INVENTOR
George S. Fouts.
BY Munn & Co.
ATTORNEYS.

(No Model.) 3 Sheets—Sheet 3.
G. S. FOUTS.
ELEVATOR DRIVE WHEEL.
No. 576,960. Patented Feb. 9, 1897.
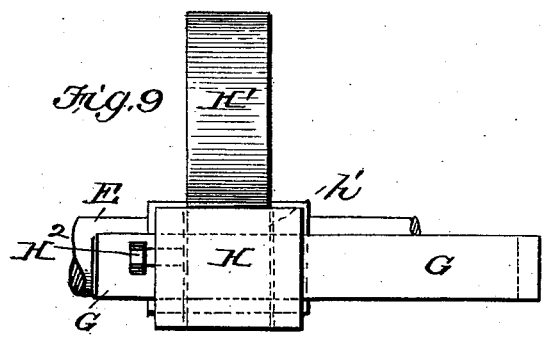
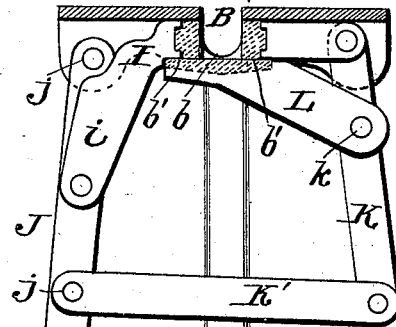
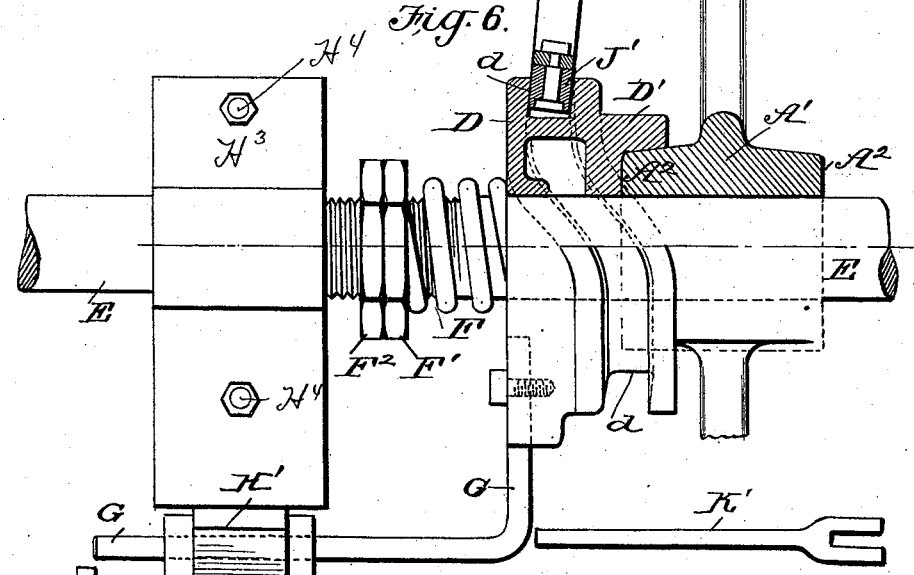
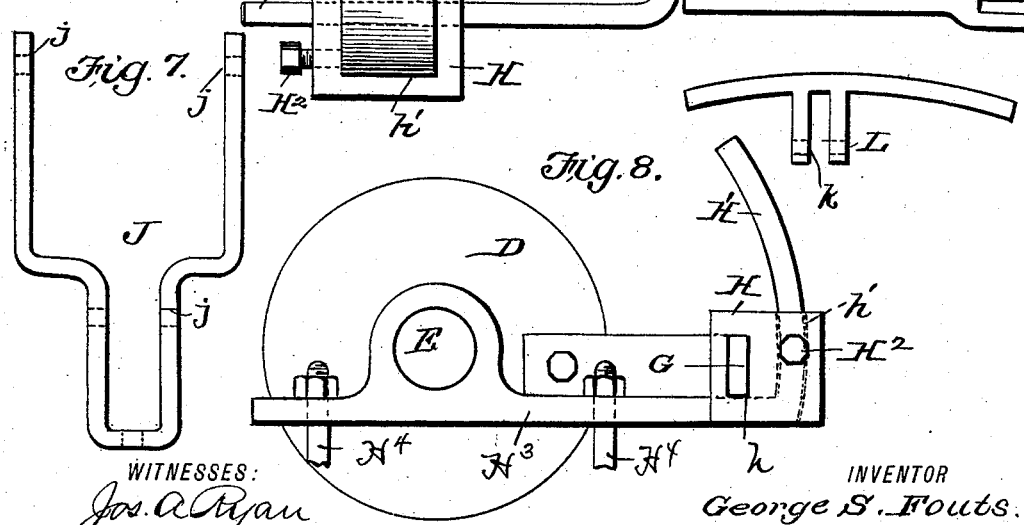
WITNESSES:
Jos. A. Ryan
P. B. Turpin
INVENTOR
George S. Fouts.
BY Munn & Co.
ATTORNEYS.

UNITED STATES PATENT OFFICE.

GEORGE SHOUME FOUTS, OF SAN JOSÉ, CALIFORNIA.

ELEVATOR DRIVE-WHEEL.

SPECIFICATION forming part of Letters Patent No. 576,960, dated February 9, 1897.

Application filed February 11, 1896. Serial No. 578,887. (No model.)

*To all whom it may concern:*

Be it known that I, GEORGE SHOUME FOUTS, residing at San José, in the county of Santa Clara and State of California, have invented a new and useful Improvement in Elevator Drive-Wheels, of which the following is a specification.

This invention is an improved drive-wheel for use on elevators and other carriers and for other uses where it is desired to drive a rope, cable, or other band for any purpose; and the invention consists in certain features of construction and novel combinations of parts, as will be hereinafter described, and pointed out in the claims.

Figure 3:
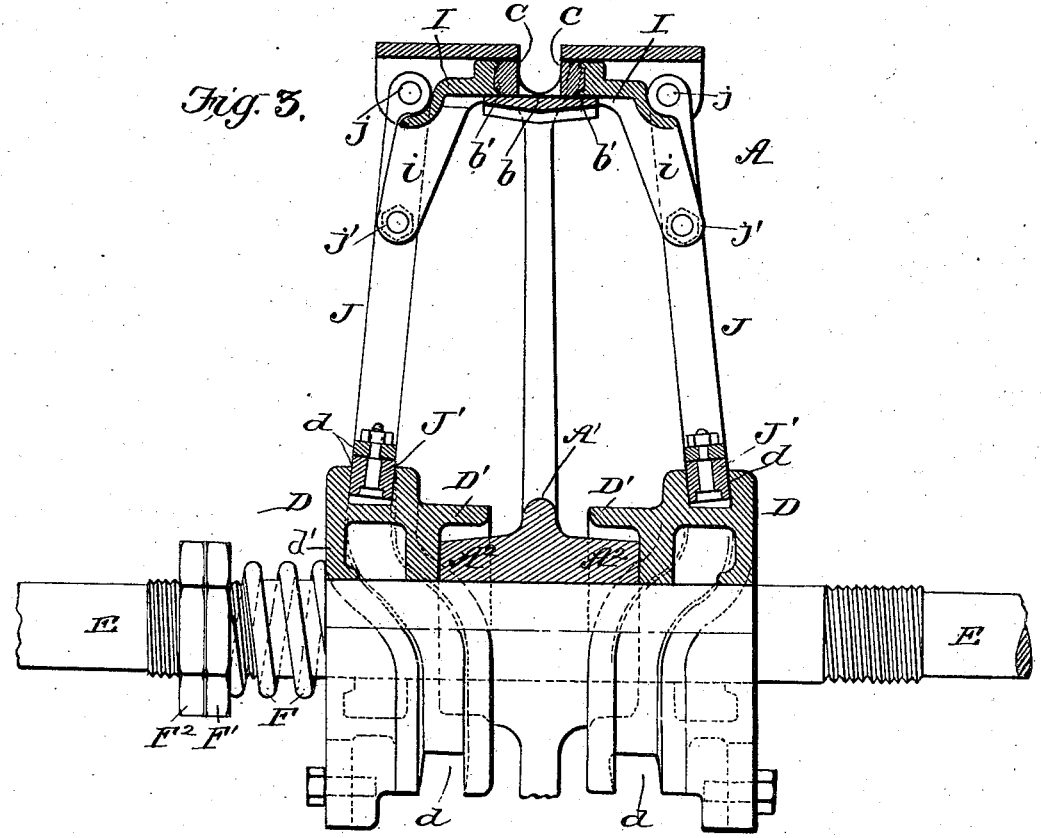
Figure 2:
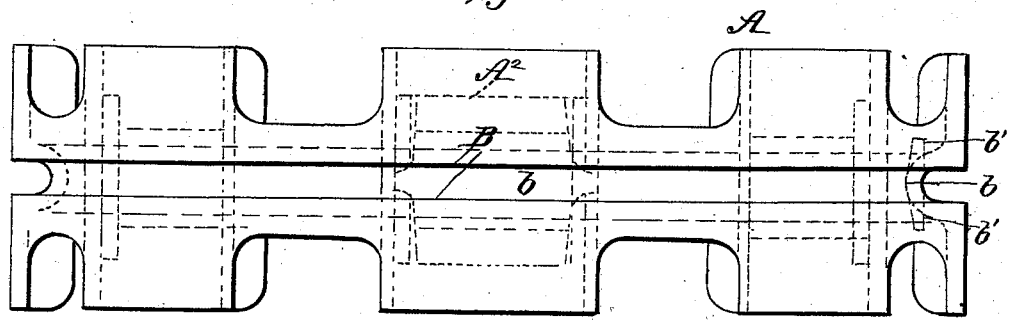

In the drawings, Figure 1 is a face view of a portion of a wheel constructed according to my invention. Fig. 2 is an edge view of the pulley. Fig. 3 is a cross-section on about line A A, Fig. 1. Fig. 4 is a detail cross-section on about line B B, Fig. 1. Fig. 5 illustrates in detail one of the gripping-sections. Fig. 6 is a cross-sectional view illustrating the construction whereby one lever will operate two opposite gripping-sections. Fig. 7 is a detail view of the form of lever shown in Fig. 6. Fig. 8 is a detail view illustrating the anchor-bar, its carrier, and the curved guide therefor; and Fig. 9 is a detail front view of the devices for securing the adjustment of the cam-ring.

The pulley A is provided in its rim with a groove B, adapted to receive the rope or cable, and the base $b$ of this groove is continuous and unbroken, forming a smooth solid seat for the rope throughout the circumference of the pulley. At intervals the side walls of the groove B are provided with openings C, through which the gripping-sections operate, as will be understood from Figs. 1 and 3. The base-wall $b$ of the groove B is extended laterally at $b'$, beneath the openings C, and operates to form guides on opposites of openings C and leading thereto, as shown most clearly in Fig. 3. I also provide guide-ribs $b^2$, leading outward from the extension $b'$ and prolonging the guides for the gripping-section.

The hub A' is extended at $A^2$, as shown, and the cam-ring D slides upon the axle E and has at its inner end a tubular extension D', which extends over the end of the hub, as shown in Fig. 3. Where two cam-rings are used, as shown in Fig. 3, one is arranged to fit over each end of the hub, and the advantage of this particular construction is that the inner run of the cam-groove $d$ may extend in beyond the outer end of the hub and so secure a compact arrangement of the pulley and cam-ring. This cam-ring D has its outer end $d'$ made flat and plane to furnish a good bearing for the coil-spring F, which encircles the shaft E and bears at one end against the cam-ring, and is held at its other end by a set-nut F', tightened in place by a jam-nut $F^2$, by which construction the tension of the spring may be varied.

In order that the cam-rings may be set rotarily on the shaft and secured in any suitable adjustment, I secure to each of such cam-rings an anchor G, the other end of which is held by carrier H, which in turn is held to a curved guide H' by means of a clamp $H^2$, preferably a screw, as shown. This curved guide H' is preferably a segmental bar integral with a part $H^3$ of the supporting-frame, which part $H^3$ may be secured by bolts $H^4$. The guide H' fits in an opening $h'$ in the carrier H, the latter also having an opening $h$, through which the anchor-bar plays back and forth as the cam-ring slides in and out along the shaft. The purpose of securing the anchor-bar slidably in the carrier is to avoid any interference with the free movement of the cam-ring along the shaft. The gripping-sections I are provided at their outer ends with projecting arms $i$, and the levers J are pivoted at their outer ends at $j$ to the pulley, and said levers are connected between their ends at $j'$ to the arms $i$ of the gripping-section and are provided at their inner ends with rollers J', operating in the cam-groove $d$ of the cam-ring D.

In operation as the pulley revolves, the cam-ring being held from turning, the levers will be operated by the traverse of their rollers J' in the groove $d$ to set the gripping-sections into and out of binding contact with the rope. If at any time any unusual projection occurs upon the rope, the spring engaging the cam will permit the sections to yield, as will be understood from Fig. 3.

In Fig. 3 I show cam-rings arranged one at each end of the pulley-hub; but it may be desirable in some instances to use but a single cam-ring and to operate the opposite gripping-sections therefrom. This may be effected by the construction shown in Fig. 6, in which the lever is arranged to operate the gripping-section on the left in the same manner as before described and as illustrated in Fig. 3; but the gripping-section on the right is connected with the upper end of the supplemental lever K, which is pivoted at $k$ to arms L integral with and projecting from the base of the groove B, and the inner lower end of said supplemental lever K is connected by a link K' with the lever J, which derives its motion from the cam-ring D. In the operation of this construction shown in Fig. 6 it will be seen that the movement of the main lever J, through the connections shown, will tend to force the gripping-sections in opposite directions, either in to grip the rope or out to free the same.

The cam-groove is so formed that it will operate the gripping-section to grip the rope on a portion of the circumference of the pulley and free it at other portions, such construction permitting the rope to move freely into and out of contact with the pulley and yet tightly clamping the rope to the pulley, so it may be efficiently driven thereby, as desired.

Having thus described my invention, what I claim, and desire to secure by Letters Patent, is—

1. The combination with a pulley and with opposite gripping-sections, of a cam at one side of the pulley, and connections with both gripping-sections operated by said cam for moving both sections simultaneously, substantially as described.

2. In an apparatus substantially as described, the pulley having its rope-groove formed with a continuous and unbroken base and provided at intervals with lateral guides for the clamping-sections and with guide-ribs leading outward from such extensions and the oppositely-movable gripping-sections substantially as set forth.

3. In an apparatus substantially as described, the combination of the pulley, the gripping-section, a cam-ring, intermediate devices between the said ring and the gripping-section, and a spring by which said cam-ring is yieldingly held to place, substantially as shown and described.

4. The combination with the shaft, the pulley, the gripping-section, the cam-ring and the connections between said cam-ring and the gripping-section, of a spring encircling the shaft and holding the cam-ring yieldingly to place, substantially as shown and described.

5. The combination of the pulley having an extended hub, the gripping-section, the cam-ring extended at its inner end over the pulley-hub, connections between said cam-ring and the gripping-section and a spring by which said cam-ring is held yieldingly to place, substantially as shown and described.

6. The combination of the pulley, gripping-sections, the cam-ring, an anchor-bar connected with said cam-ring, a carrier for said bar, and a curved guide for said carrier substantially as shown and described.

7. The combination of the pulley, the gripping-sections, the cam-ring for operating said sections, the spring by which said cam-ring is yieldingly held to place, an anchor-bar connected with the cam-ring, a carrier for said bar having an opening in which the bar is slidingly held, and a curved guide for said carrier, substantially as shown and described.

8. The combination with the pulley having the opposite gripping-sections, of a cam-ring at one side of said pulley, a lever engaged by said cam-ring and connections between said lever and the opposite gripping-sections, substantially as shown and described.

GEORGE SHOUME FOUTS.

Witnesses:
CHARLES R. BELL,
JAS. R. EDMONDSON.